Feb. 20, 1962 H. HENSS 3,022,447
CONTROL PANEL FOR MEASURING INSTRUMENTS
Filed Nov. 5, 1957
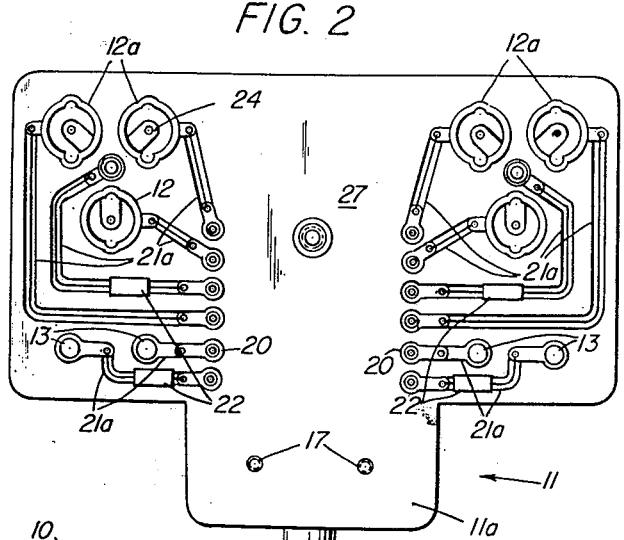
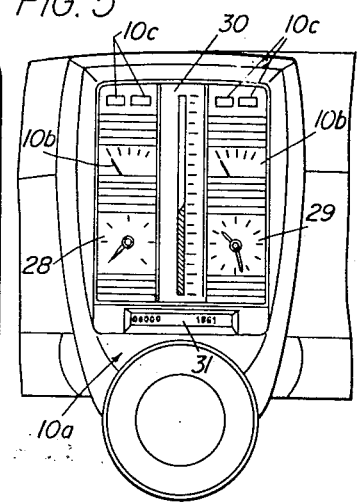
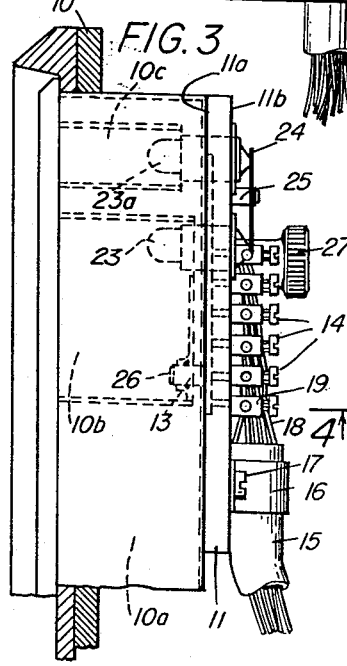
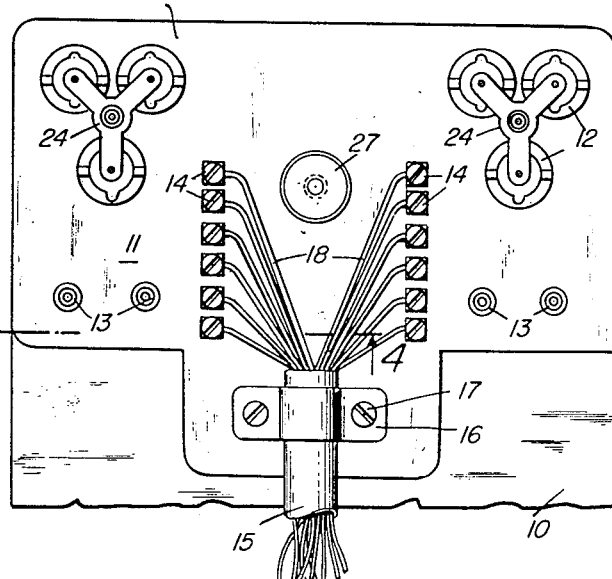
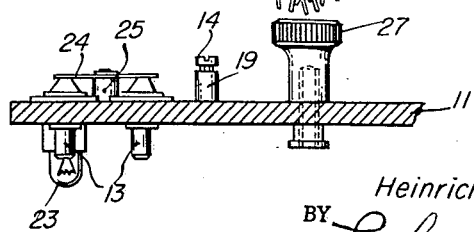
INVENTOR.
Heinrich Henss United States Patent Office 3,022,447
Patented Feb. 20, 1962

3,022,447
CONTROL PANEL FOR MEASURING INSTRUMENTS
Heinrich Henss, Frankfurt am Main, Germany, assignor to Vdo Tachometer Werke, Adolph Schindling G.m.b.H,. Frankfurt am Main, Germany, a corporation of Germany
Filed Nov. 5, 1957, Ser. No. 694,604
Claims priority, application Germany Dec. 13, 1956
4 Claims. (Cl. 317—99)

This invention relates to a means and method of electrically connecting multiple measuring instruments and signalling devices such as used in power driven vehicles. More particularly, the invention relates to a combination connector plate and signal device which is plugged as a unit into such measuring instrument apparatus, but is not restricted to such use.

Apparatus combining measuring instruments, such as thermometers, gages, speedometers, pressure indicators as well as warning lights such as for automatic gear switches, emergency brakes, directional signalling, high beam lights, etc., require complex multiple wiring and circuits which are difficult to assemble and after assembly are not readily accessible for repair and replacement of parts. This is particularly true of the lamps used for illuminating and signalling purposes especially when indirect lighting is used. Sockets for the lamps are usually placed singly in a socket carrier arranged upon the rear wall of the apparatus. The lamps required are so small and numerous and the space available so restricted that it is not only laborious and confusing to assemble, but inconvenient and time-consuming to correctly replace burnt-out lamps, fuses, switches and other components thereof without disrupting adjacent circuiting.

An object of the invention, therefore, is to develop an improved, simplified method and means of electrically connecting and operating such multiple instrument apparatus, so as to afford ready accessibility to all of its component parts.

A feature of this invention is that of assemblying the complete wiring circuits and components for the control thereof, including signalling and illuminating lamps, fuses and switches of a multiple instrument apparatus on a single connector plate. The connector plate is constructed to simultaneously enclose the rear of the apparatus and electrically plug into the several instruments thereof as a unit. The plate may be then releasably fastened in such operative position so that any part of the assembly circuit is always readily accessible for replacement and repair by merely releasing a single combination handle and quick-disconnect fastener to remove the plate as a unit from the rear of the apparatus for full visible inspection.

Furthermore, by using the die casting process, lamp and other sockets as well as circuits therefor may be simultaneously injected into the plate. When mass produced, circuit wirings and switch connections may be printed or metal coated on the device.

The cable conduit pipe forms an integral part of the connector plate permitting lifting the plate as a collective plug-in from the apparatus while still under current. This important feature wherein the lamps remain lighted on the plate greatly facilitates detection of defective bulbs and fuses as well as making other necessary repairs.

Further objects, features and advantages of the invention will be pointed out in the following description and claims and illustrated in the accompanying drawings which disclose the principle of the invention and the best mode which has been contemplated of applying the principle, wherein:

FIG. 1 is a rear elevation of a connector plate mounted for operative association with a multiple instrument apparatus;

FIG. 2 is a front elevation of a simplified embodiment of the unitary plug-in connector plate which when in mounted position faces the rear of the combined multiple apparatus;

FIG. 3 is a side elevational view of the connector plate illustrated in FIG. 1 shown plugged into the rear of the apparatus which is permanently installed in the dashboard;

FIG. 4 is a fragmentary cross sectional view of the plate taken on line 4—4 of FIG. 1 showing the untiary means of electrically connecting grouped components of the apparatus; and FIG. 5 is a front elevation of the apparatus permanently mounted on an instrument panel.

Referring to the drawings, FIGS. 1 and 3 indicate a dashboard or instrument panel 10 such as used in power-driven vehicles, upon which a combined multiple signalling measuring and multiple instrument apparatus 10a is permanently mounted in any conventional manner. A unitary contact and closure plate 11 provides the complete electrical circuits and illumination of the instruments 10b as well as the signalling devices 10c for the apparatus.

As will be seen from FIGS. 1, 2 and 3, the connector plate 11 is provided with spaced lamp sockets 12, 12a extending therethrough. Sockets may also be provided for instrument contact connector pins 13 and for terminal screws 14.

A multiple cable or combined lead-in conduit pipe 15 may be integral with or secured to the plate by suitable means such as clamp 16 and screws 17. Leads 18 connected to an electrical source such as a battery (not shown), are individually secured to respective terminals 19 by screws 14. The screw terminals penetrate the plate to contact soldering lugs 20 on the front face 11a.

Circuit measuring leads 21 and switch connections 21a extend from lugs 20 to sockets 12, 12a and projecting contact pins 13. Advantageously, these wiring circuits may be printed or metal coated upon the front face 11a of the plalte as will be hereinafter described and may include fuses 22.

Lamps 23 illuminate various instruments such as speedometers, thermometers, generators, pressure indicators, gasoline gages and lamps 23a operate indicating signals 10c for emergency brakes, automatic gears, high beam lights and various measuring values. Lamp sockets 12, 12a may be advantageously disposed in group relation as shown in the drawings. In this arrangement a three-armed contact spring 24 forms a common reciprocal pole for the illuminating and signalling lamps and may be mounted on a boss 25 disposed on the rear face 11b of the connector plate as clearly shown in FIGS. 3 and 4.

The combination instruments in apparatus 10a are provided with contact slots or sockets 26 into which contact pins 13 are plugged. Thus positioned, the plate may be advantageously secured to the apparatus by a single nondetachable master lock screw 27 which also conveniently combines to form a handle for mounting and demounting purposes.

It will be seen that the entire electrical connections for controlling, illuminating and operating the measuring instruments as well as the signalling devices are compactly carried by a single collective plug-in plate which is readily disengaged for replacing a burnt out bulb, fuse, switch or other component thereof without any danger of misconnecting any of the several respective circuits. Advantageously, by using the die casting process, sockets for lamps, connector pins and terminal screws, as well as informative indicia relative to the full control of the apparatus may be simultaneously injected into the face of the plate. Also by such mass production methods, the wiring circuits and switch connections may be printed or metal coated upon the plate, in which case cross sections may be intensified by galvanization or electroplating to meet requirements of certain switch connections.

FIG. 5 indicates a driver's view of one embodiment of the apparatus 10 as seen from the front of the dashboard. The particular apparatus illustrated shows electrically operated signal devices 10c and measuring instruments 10b such as temperature and fuel gauges combined with mechanically operated devices such as an oil pressure gauge 28, clock 29, speedometer 30 and odometer 31. It is understood, however, that if additional electrical appliances were used, such as a clock, cigarette lighter, etc., these too would be serviced by a single plate 11.

The advantages of this improved multiple instrument apparatus includes simplification of assembly, economy of production and ready accessibility of the single, collective signal-device-plug-in plate over known assembly methods and devices will be obvious to those skilled in the art.

The forms of the invention here described and illustrated are presented merely as examples of how the invention may be embodied and applied. Other forms, embodiments and applications of the invention, coming within the proper scope of the appended claims, will, of course suggest themselves to those skilled in the electrical field.

I claim:

1. For use in a motor vehicle or the like having a permanently installed instrument panel, a multiple measuring instrument apparatus permanently mounted on the front face of said panel, signalling devices for said apparatus, openings for said signalling devices and connector sockets disposed in the rear of said multiple apparatus, a single insulated electrical connector plate for said multiple apparatus removably mounted on the rear thereof behind said panel, said signalling devices being carried by said connector plate, a distribution conduit secured to said plate and connected to the circuits disposed thereon, lamp means mounted on said plate for said signalling devices disposed thereon and for illuminating said instruments when said plate is mounted on the rear of said multiple apparatus, said illuminating lamps and signalling lamps connected to said conduit being adapted to remain lighted when said plate is disconnected from its relatively inaccessible position behind said panel to facilitate detection and replacement of defective elements thereof, and connector pins mounted on said connector plate to mate with said sockets in said multiple apparatus when said connector plate is unitarily attached thereto, said pins connecting said instruments to appropriate circuits in such vehicle when said plate is in such mounted position on said multiple apparatus.

2. A connector plate according to claim 1 having printed metal coated switch connections in said circuits disposed on said plate.

3. A connector plate according to claim 1 wherein said plate is provided with a single, non-detachable handle to simultaneously connect and disconnect all of the measuring instruments in said multiple apparatus with respective circuits therefor and provide signalling devices and signalling and illuminating lamps for all of said measuring instruments.

4. A connector plate according to claim 1 wherein fuses provided in said circuits are carried by said plate.

References Cited in the file of this patent

UNITED STATES PATENTS

| 1,439,511 | Genn | Dec. 19, 1922 |
| 1,658,516 | Daine | Feb. 7, 1928 |
| 1,694,006 | Fitzsimmons | Dec. 4, 1928 |
| 1,787,684 | Jocobi | Jan. 6, 1931 |
| 1,955,418 | Folen | Apr. 17, 1934 |
| 2,167,209 | Huskey | July 25, 1939 |
| 2,423,597 | Hurn | July 8, 1947 |
| 2,439,326 | Wilson | Apr. 6, 1948 |
| 2,543,348 | Squier | Feb. 27, 1951 |
| 2,590,821 | Kiser | Mar. 25, 1952 |
| 2,614,156 | Nims | Oct. 14, 1952 |
| 2,625,591 | George | Jan. 13, 1953 |
| 2,694,249 | Kapp | Nov. 16, 1954 |
| 2,714,195 | Beatty | July 26, 1955 |
| 2,759,098 | White | Aug. 14, 1956 |
| 2,826,628 | Kruse | Mar. 11, 1958 |

FOREIGN PATENTS

| 571,612 | Great Britain | Aug. 31, 1945 |